US011906240B2

(12) United States Patent
Du et al.

(10) Patent No.: US 11,906,240 B2
(45) Date of Patent: Feb. 20, 2024

(54) REFRIGERATOR AND METHOD FOR OPERATING A REFRIGERATOR

(71) Applicant: BSH HAUSGERAETE GMBH, Munich (DE)

(72) Inventors: Li Du, Nanjing (CN); Jing Hong, Nanjing (CN); Yu Xia, Nanjing (CN)

(73) Assignee: BSH Hausgeraete GmbH, Munich (DE)

( * ) Notice: Subject to any disclaimer, the term of this patent is extended or adjusted under 35 U.S.C. 154(b) by 439 days.

(21) Appl. No.: 16/697,632

(22) Filed: Nov. 27, 2019

(65) Prior Publication Data

US 2020/0173714 A1 Jun. 4, 2020

(30) Foreign Application Priority Data

Nov. 29, 2018 (CN) .......................... 201811439375.2

(51) Int. Cl.
*F25D 27/00* (2006.01)
*F25D 11/02* (2006.01)
*F25D 25/02* (2006.01)

(52) U.S. Cl.
CPC ............ *F25D 27/005* (2013.01); *F25D 11/02* (2013.01); *F25D 25/025* (2013.01); *F25D 2300/00* (2013.01); *F25D 2325/021* (2013.01); *F25D 2400/36* (2013.01)

(58) Field of Classification Search
CPC ...... F25D 27/005; F25D 11/02; F25D 25/025; F25D 2300/00; F25D 2325/021; F25D 2400/36; F25D 2700/02; F25D 11/00; F25D 27/00; F25D 29/003; F25D 29/005; H04N 7/16
See application file for complete search history.

(56) References Cited

U.S. PATENT DOCUMENTS

| 10,036,587 B2 | 7/2018 | Kim et al. |
| 2010/0320890 A1 | 12/2010 | Jung et al. |
| 2014/0300265 A1* | 10/2014 | Lee ..................... H04N 5/44504 312/405.1 |
| 2014/0313328 A1* | 10/2014 | Park ....................... F25D 29/00 348/143 |
| 2014/0313331 A1* | 10/2014 | Kim ........................ F25D 29/00 348/143 |
| 2016/0138860 A1* | 5/2016 | Kang ..................... F25D 29/00 62/130 |

FOREIGN PATENT DOCUMENTS

| CN | 101949627 A | 1/2011 |
| CN | 105222521 A | 1/2016 |

* cited by examiner

*Primary Examiner* — Larry L Furdge
(74) *Attorney, Agent, or Firm* — Laurence A. Greenberg; Werner H. Stemer; Ralph E. Locher

(57) ABSTRACT

A refrigerator includes a receiving chamber and a drawer movably received in the receiving chamber. The drawer is at a first location when it is closed. The refrigerator further includes a first sensor that is fixed to the drawer or a wall of the receiving chamber. The first sensor is configured to detect when the drawer reaches a second location. The first and second locations are spaced apart by a spacing distance.

21 Claims, 5 Drawing Sheets

REFRIGERATOR AND METHOD FOR OPERATING A REFRIGERATOR

CROSS-REFERENCE TO RELATED APPLICATION

This application claims the priority, under 35 U.S.C. § 119, of Chinese patent application CN 201811439375.2, filed Nov. 29, 2018; the prior application is herewith incorporated by reference in its entirety.

BACKGROUND OF THE INVENTION

Field of the Invention

The present invention relates to a refrigerator and a method for operating a refrigerator, and in particular, to a refrigerator having a drawer and a method for operating the refrigerator.

Chinese published patent application CN101949627A discloses a refrigerator, the refrigerator including a sensing unit for detecting opening and closing of a drawer-type door, to determine whether the drawer-type door is opened or closed and control an illumination unit based on a determining result.

Chinese published patent application CN105222521A discloses a refrigerator including a movable drawer to arrange a video recorder that records a video of an interior of the drawer from an exterior of the drawer, where the drawer has a mark. The refrigerator includes a control unit, the control unit being arranged to sense a location of the mark in a plurality of photographs taken by the video recorder at respective time intervals, and determine state information of the drawer based on changes in locations of marks in the plurality of photographs. The state information of the drawer includes at least one of the following: an extent to which the drawer is pulled out, whether the drawer is pulled out, a direction in which the drawer is moved, and a stopped state or a moving state of the drawer.

SUMMARY OF THE INVENTION

It is accordingly an object of the invention to provide a refrigerator and a method of operating a refrigerator which overcomes the above-mentioned and other disadvantages of the heretofore-known devices and methods of this general type and which provides an improved refrigerator and an improved method for operating a refrigerator.

With the foregoing and other objects in view there is provided, in accordance with the invention, a refrigerator, comprising:
- a refrigerator body formed with a receiving chamber;
- a drawer movably received in said receiving chamber, said drawer being at a first location when said drawer is closed and being movable to a second location that is spaced from the first location; and
- a first sensor mounted to move with said drawer or being fixed to a wall of said receiving chamber, said first sensor being configured to detect whether the drawer reaches the second location that is spaced from the first location.

In other words, one embodiment of the present invention relates to a refrigerator. The refrigerator is formed with a receiving chamber; a drawer movably received in the receiving chamber, movably received in the drawer of the receiving cavity, the drawer being at a first location when closed; and a first sensor, the first sensor being fixed to a wall of the receiving chamber or being adapted to move with the drawer, the first sensor being configured to detect whether the drawer reaches a second location, and a spacing existing between the second location and the first location. The drawer may be a container or it may be a movable shelf.

In the embodiments of the present invention, it is detected, using the first sensor that is disposed in the receiving chamber or may move with the drawer, whether the drawer reaches the second location after leaving the first location, so that a state after the drawer leaves the first location can be more accurately determined. It may be expected that the refrigerator can more intelligently control other drawer-related function elements on this basis.

In some embodiments, the second location may be located between the first location and the third location. The drawer is then in a maximum open state at the third location. In some embodiments, the second location may be closer to the third location than the first location. In some embodiments, the drawer is in a maximum open state at the second location.

In some embodiments, a trigger disposed on a wall of the receiving chamber or on the drawer may be included, the first sensor and the trigger being staggered at the first location, and the trigger triggering the first sensor at the second location. The second location may be reliably positioned using the first sensor and the trigger, thereby helping accurately and reliably determine whether the drawer reaches the second location. The first sensor being "triggered" may include a change in the state of any component in the first sensor.

In some embodiments, the trigger may be adapted to generate a physical quantity that is adapted to be sensed by the first sensor. In some other embodiments, the first sensor may include a mechanical switch, the trigger being adapted to mechanically trigger the mechanical switch at the second location.

In some embodiments, the first sensor may include a magnetosensitive element and the trigger includes a magnet.

In some embodiments, a second sensor is included, the second sensor being configured to detect whether the drawer is at the first location, and a control unit determining, based on feedback of the first sensor and the second sensor, a direction in which the drawer is moved to the second location.

In some embodiments, a spacing may exist between the first sensor and the second sensor along the direction in which the drawer is moved, the trigger being adapted to match the second sensor at the first location.

In some embodiments, after receiving, from the second sensor, a signal indicating that the drawer leaves the first location, when receiving, from the first sensor for an odd number of times, a signal indicating that the drawer reaches the second location, the control unit may determine that the drawer is moved to the second location along a direction in which the drawer is opened.

In some embodiments, after receiving, from the second sensor, a signal indicating that the drawer leaves the first location, when receiving, from the first sensor for an even number of times, a signal indicating that the drawer reaches the second location, the control unit may determine that the drawer is moved to the second location along a direction in which the drawer is closed.

In some embodiments, the first sensor may include a distance sensor for detecting a distance between the drawer and a reference object. In the embodiment in which the distance sensor is disposed in the drawer, a distance between the drawer and the reference object may be a distance between the distance sensor and a rear wall of the receiving chamber. In the embodiment in which the distance sensor is disposed in the rear wall of the receiving chamber, a distance between the drawer and the reference object may be a distance between a specific part of the drawer (such as the rear wall of the drawer) and the distance sensor. It may be reliably determined, through detecting the distance, that the drawer reaches the second location.

In some embodiments, the first sensor may be connected to the control unit, and when it is determined, based on a detection result of the first sensor for an even number of times, that the drawer is at the second location after the drawer leaves the first location, the control unit determines that the drawer is moved to the second location along a direction in which the drawer is closed.

In some embodiments, the refrigerator may include a control unit and a power-consuming function component located above the drawer, the control unit receiving feedback of the first sensor and controlling the power-consuming function component based on a detection result of the first sensor. The power-consuming function component is adapted to perform an operation associated with the drawer, such as photographing a drawer, illuminating a drawer, applying mist to the drawer, driving the components associated with movement of the drawer, and/or projecting the drawer.

In some embodiments, the power-consuming function component may include a video recording module located above the drawer; the control unit is configured to determine that the drawer is moved to the second location along a direction in which the drawer is opened, the video recording module recording a video of an interior of the drawer; and/or, the control unit is configured to determine that the drawer is moved to the second location along a direction in which the drawer is closed, the video recording module recording a video of the interior of the drawer.

When the second location is used as a trigger location for triggering the video recording module, a distance between the second location and a third location may be less than a distance between the second location and the first location. In some embodiments, the second location may be close to the third location to record a video of an interior of a drawer of a relatively large range.

In some embodiments, the control unit is configured to start timing when the drawer reaches the second location, the video recording module recording a video of an interior of the drawer when a preset duration elapses.

In some embodiments, the video recording module may be disposed downward and obliquely toward a front of the refrigerator.

In some embodiments, the video recording module may be disposed at a front portion of a top wall of the receiving chamber or is fixed to a beam that connects the receiving chamber to a pair of side walls and that is located above the drawer.

In some embodiments, the power-consuming function component includes an illumination unit for illuminating a drawer that is opened, the control unit receiving feedback of the first sensor to control the illumination unit.

In some embodiments, the control unit may be configured to determine that when the drawer is located between the second location and the third location, the illumination unit is turned on, or luminance of the illumination unit is higher than that when the drawer is located between the second location and the first location.

In some embodiments, the power-consuming function component may include a drive component for driving the drawer to move, the drive component driving the drawer to move when the drawer reaches the second location. In some embodiments, the drive component may be used to drive the drawer to continue moving along the original direction when the drawer reaches the second location. In some other embodiments, after the drawer reaches the second location, the drive component drives the drawer to move in a vertical direction or in a left-right direction.

Another aspect of the embodiments of the present invention is directed to a method for operating a refrigerator. The refrigerator includes: a receiving chamber, a drawer movably received in the receiving chamber, a video recording module located above the drawer, and a first sensor fixed to a wall of the receiving chamber or adapted to move with the drawer, the drawer being closed at a first location. The method includes: detecting, by a first sensor, whether a drawer leaving a first location reaches a second location, a spacing existing between the second location and the first location; and determining, by a control unit based on a detection result of the first sensor, whether a video recording module records a video of an interior of a drawer.

In some embodiments, the control unit may determine, based on a direction in which the drawer is moved to the second location, whether the video recording module records a video of the interior of the drawer.

In some embodiments, a second sensor may detect whether the drawer leaves the first location, the control unit determines, according to detection results of the first sensor and the second sensor, a direction in which the drawer is moved to the second location.

In some embodiments, when the drawer is moved to the second location along a direction in which the drawer is closed, the video recording module may record a video of the interior of the drawer.

Still another aspect of the embodiments of the present invention is directed to a method for operating a refrigerator. The refrigerator includes: a receiving chamber, a drawer that may be pushed into or pulled out of the receiving chamber, an illumination unit for illuminating an interior of the drawer that is opened, and a first sensor fixed to a wall of the receiving chamber or adapted to move with the drawer, the drawer being closed at a first location. The method includes: detecting, by a first sensor, whether a drawer leaving a first location reaches a second location, a spacing existing between the second location and the first location; and controlling, by a control unit, an illumination unit based on a detection result of the first sensor.

Other features which are considered as characteristic for the invention are set forth in the appended claims.

Although the invention is illustrated and described herein as embodied in a refrigerator and a method for operating a refrigerator, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
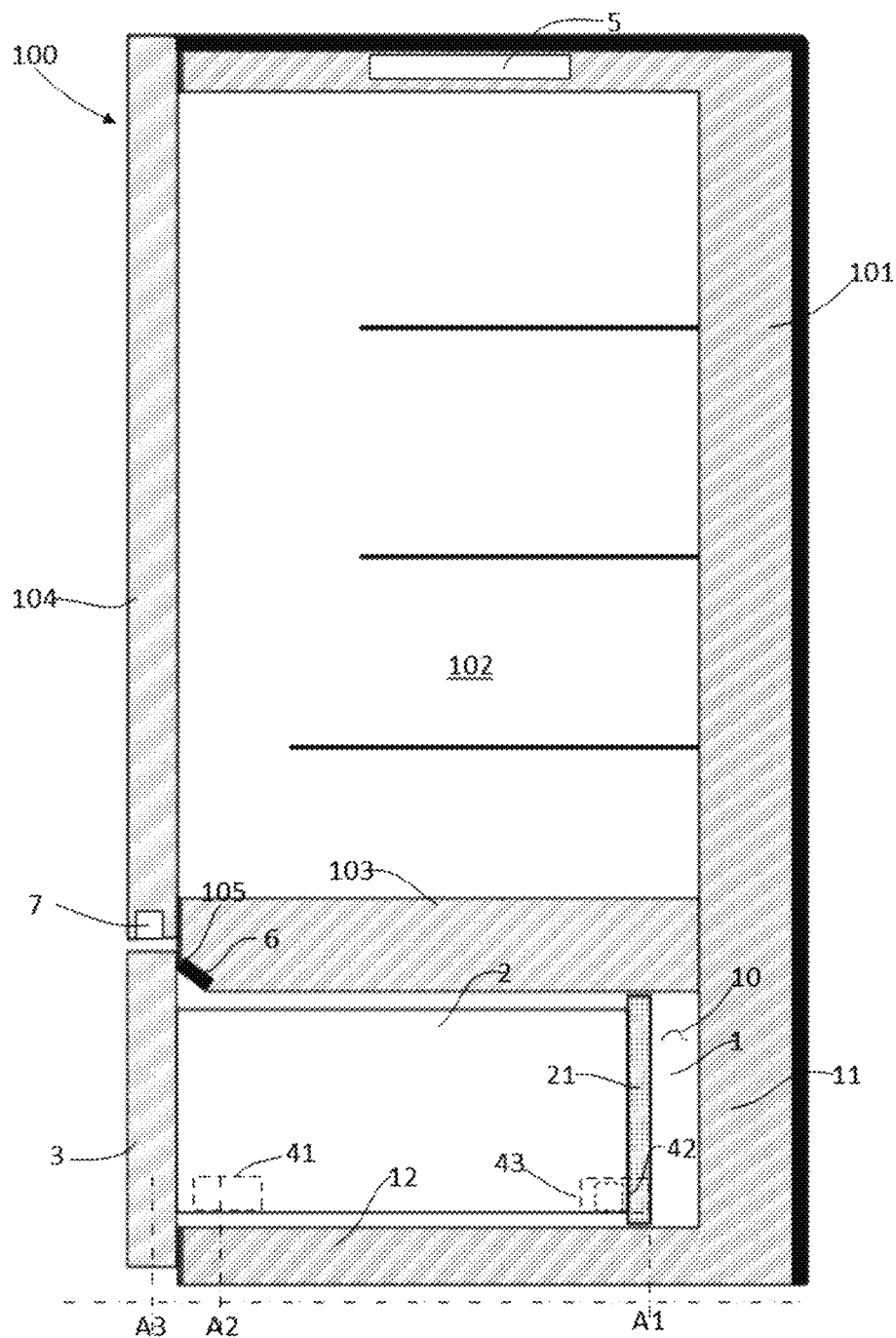
FIG. 1 is a schematic cross-sectional view of a refrigerator according to an embodiment of the present invention, where a drawer is in a closed state.

Referring now to the figures of the drawing in detail and first, particularly, to FIG. 1 thereof, there is shown a refrigerator 100 which includes a receiving chamber 1 and a drawer 2 that is movably received in the receiving chamber 1. In an embodiment, the receiving chamber 1 may be formed by a storage compartment of a cabinet 101. The drawer 2 is connected to a door 3 for covering the receiving chamber 1. The drawer 2 is pushed into or is at least partially pulled out of the receiving chamber 1 with movement of the door 3.

While the drawing figures illustrate the drawer 2 in the form of a container connected to the door 3, the drawer 2 may also be a movable shelf connected to the door 3.

The refrigerator 100 may include a slide rail 302, a slide rail of the drawer 2 being coupled to a pair of side walls 10 (only one side wall is shown) of the receiving chamber 1.

It should be understood that, in some other embodiments, the receiving chamber may also be located within the storage compartment of the refrigerator, and the drawer may be moved independently of the door for covering the storage compartment. The receiving chamber 1 may be defined by one or more components.

As shown in FIG. 1, the refrigerator 100 includes another storage compartment 102 located above the receiving chamber 1. There is a separation wall 103 between the receiving chamber 1 and the storage compartment 102. The storage compartment 102 may be covered by another door 104 located above the door 3.

Figure 2:
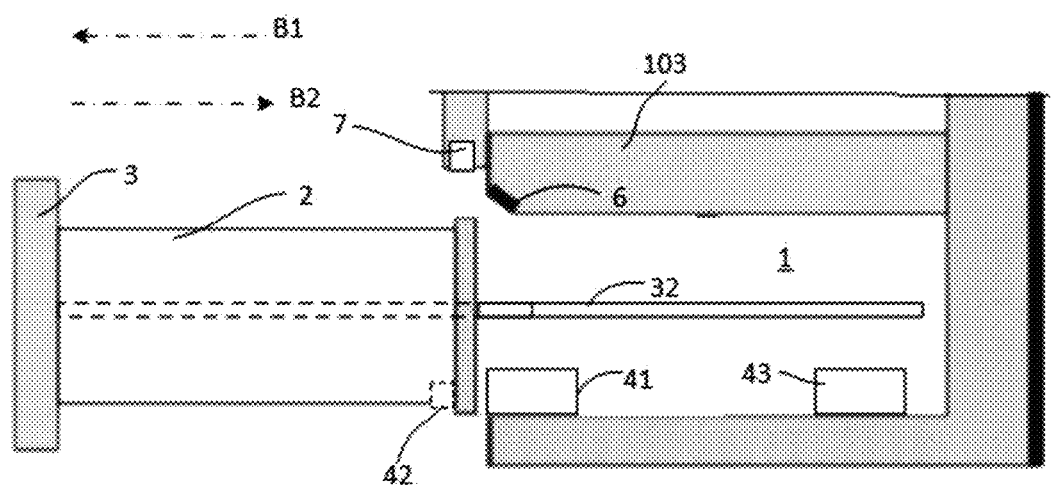
FIG. 2 is a schematic partial cross-sectional view of a refrigerator according to an embodiment of the present invention, where a drawer is in a maximum open state.

The drawer 2 may move in a front-rear direction between a first location A1 and a third location A3. The term location, as used in this context, is synonymous with the term position. At the first location A1, the drawer 2 enters the receiving chamber 1 and reaches the most rearward location. As shown in FIG. 1, the drawer is closed at the first location A1. As shown in FIG. 2, as the third location A3, the drawer 2 is moved to a location farthest from a rear wall 11 of the receiving chamber 1. At the third location, the drawer 2 may be completely withdrawn from the receiving chamber 1. In some other embodiments, it is also possible that a portion of the drawer 2 is still located within the receiving chamber 1. In FIG. 1, relative locations of the first location A1 and the third location A3 are schematically shown using a rear wall surface 21 of the drawer 2 as a reference.

It should be understood that the relative locations of the first location and the third location may be shown using other portions of the drawer 2 as the reference object.

When the drawer 2 is moved toward the third location A3, the drawer 2 is moved along a direction in which the drawer is opened, as shown by an arrow B1 in FIG. 2. When the drawer is moved toward the first location A1, the drawer 2 is moved along a direction in which the drawer is closed, as shown by an arrow B2.

The refrigerator 100 may include a detecting unit. The detecting unit includes a first sensor 41 fixed to a wall defining the receiving chamber 1 or mounted to move with the drawer 2. The first sensor 41 is configured to detect whether the drawer 2 reaches the second location A2, a spacing existing between the second location A2 and the first location A1.

In this embodiment, the second location A2 is located between the first location A1 and the third location A3.

At the second location A2, an interior of the drawer 2 may be exposed to an operating range of a power-consuming function component that is associated with the drawer 2 and that is of the refrigerator 100. For example, the interior of the drawer 2 may be exposed to a video recording range (schematically shown by a shadow area C in FIG. 3) of a video recording module 6 located above the drawer 2, or exposed to an illumination range of an illumination unit 7 for illuminating the interior of the drawer 2.

Figure 3:
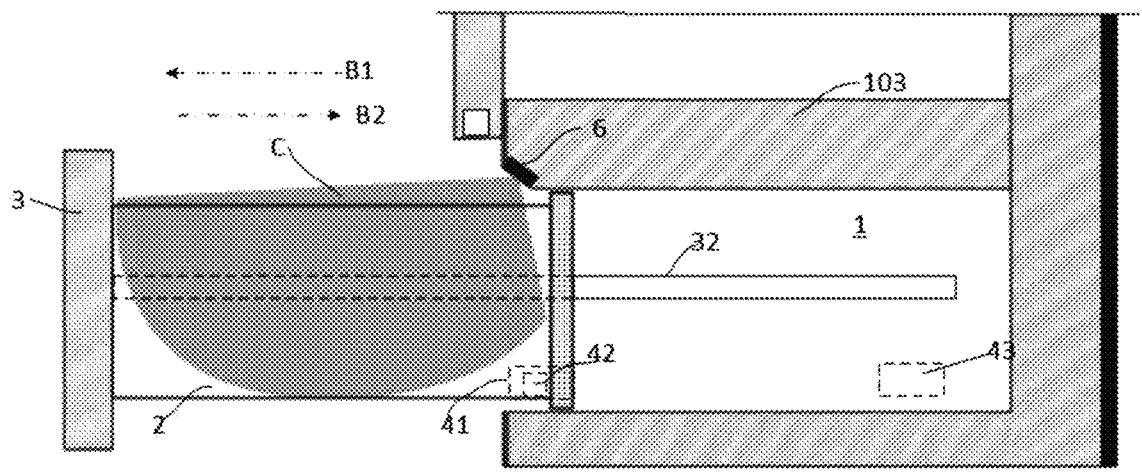
FIG. 3 is a schematic partial cross-sectional view of a refrigerator according to an embodiment of the present invention, where a drawer is being opened.

As shown in FIG. 1 to FIG. 3, the video recording module 6 may be disposed at a front end of the separation wall 103 to record a video of the interior of the drawer 2 that is opened. The video recording module 6 may be disposed downward and obliquely toward a front of the refrigerator 100.

The front end of the separation wall 103 may have a mounting portion 105 that is inclined, and the video recording module 6 is mounted to the mounting portion 105. The mounting portion 105 may be located at a lower end of the separation wall 103. In this embodiment, when the door 3 is closed, the mounting portion 105 is located in the receiving chamber 1.

The refrigerator 100 includes a control unit 5 adapted to receive feedback from the detecting unit, and the control unit 5 may control the power-consuming function component based on a detection result of the first sensor 41.

The detecting unit may include a trigger 42 for cooperating with the first sensor 41. When drawer 2 is moved, the first sensor 41 and the trigger 42 move relative to each other. Specifically, the first sensor 41 or a generator 42 fixed to the drawer 2 is moved with the drawer 2, and the trigger 42 or the first sensor 41 is immovably fixed to a side wall 10 of the receiving chamber 1.

At the first location A1, the first sensor 41 is located outside a trigger range of the trigger 42, and at the second location A2, the first sensor 41 is triggered by the trigger 42. The first sensor 41 may generate a first signal. The first signal may be a change in a state of any component of the first sensor 41. The first signal may be a high level signal, a low level signal, a level signal change, opening or closing of an electrical device such as a switch or a relay.

For example, in some embodiments, the trigger 42 may include a generator 42 that can generate a physical quantity, and the first sensor 41 may sense the physical quantity at a second location to generate a first signal.

The physical quantity may be, for example, a magnetic field or light. Therefore, the trigger 42 may be, for example, a magnet that can generate a magnetic field or a light source that can generate light.

For another example, in some embodiments, the first sensor 41 may include a mechanical switch, and the trigger 42 may be a mechanical structure for changing a state of the mechanical switch. For example, when the drawer 2 is at the second location A2, the state of the mechanical switch is changed by the trigger 42, for example, the mechanical switch is pressed to be closed or open.

In some embodiments, the first sensor 41 is disposed on the side wall 10 of the receiving chamber 1, and the generator 42 may be disposed in the drawer 2. The advantages of the solution are more apparent in the embodiment in which the trigger 42 is passive. For example, when the trigger 42 includes a magnet and the first sensor 41 includes a magnetosensitive element, the magnet fixed to the drawer 2 or on other components that are fixed together with the drawer 2 may not require power supply without needing to complicate a structure of the drawer 2.

In some embodiments, the detecting unit may further include a second sensor 43, the second sensor 43 being configured to detect whether the drawer 2 is at the first location A1.

The first sensor 41 and the second sensor 43 may be disposed apart along a direction in which the drawer 2 is moved.

The second sensor 43 may use a same principle as the first sensor 41 and has a similar structure. In some embodiments, the first sensor 41 and the second sensor 43 may share one trigger 42.

The second sensor 43 generates a second signal at the first location as a result of being triggered by the trigger 42. At the second location, the second sensor 43 is outside the trigger range of the trigger 42, and the first sensor 41 is triggered by the trigger 42 to generate a first signal.

In the foregoing embodiments, the first sensor 41 and the second sensor 43 are disposed on the side wall 10 of the receiving chamber 1. It is easy to understand that, in an alternative embodiments, a same objective can also be achieved if the first sensor 41 and the second sensor 43 are disposed on a top wall (such as the separation wall 103) or a bottom wall 12 of the receiving chamber. The first sensor, the second sensor or the trigger may be directly or indirectly connected to a wall (for example the side wall 10, the top wall 103, or the bottom wall 12) of the receiving chamber 1 mechanically.

The control unit 5 may determine, based on feedback of the first sensor 41 and the second sensor 43, a direction in which the drawer 2 is moved to the second location A2.

In some implementations, after receiving, from the second sensor 43, the second signal indicating that the drawer 2 is opened at the first location A1, when receiving, from the first sensor 41 for an even number of times after the current second signal, the first signal indicating that the drawer 2 is moved to the second location A2, the control unit 5 may determine that the drawer 2 is moved to the second location A2 along the direction in which the drawer is closed. After the current second signal, when the control unit 5 receives the first signal from the first sensor 41 for an odd number of times, the control unit 5 determines that the drawer 2 is moved to the second location A2 along a direction in which the drawer is opened. When the control unit 5 receives the second signal again (that is, the drawer 2 is closed), a count of the first signal is cleared.

Figure 4:
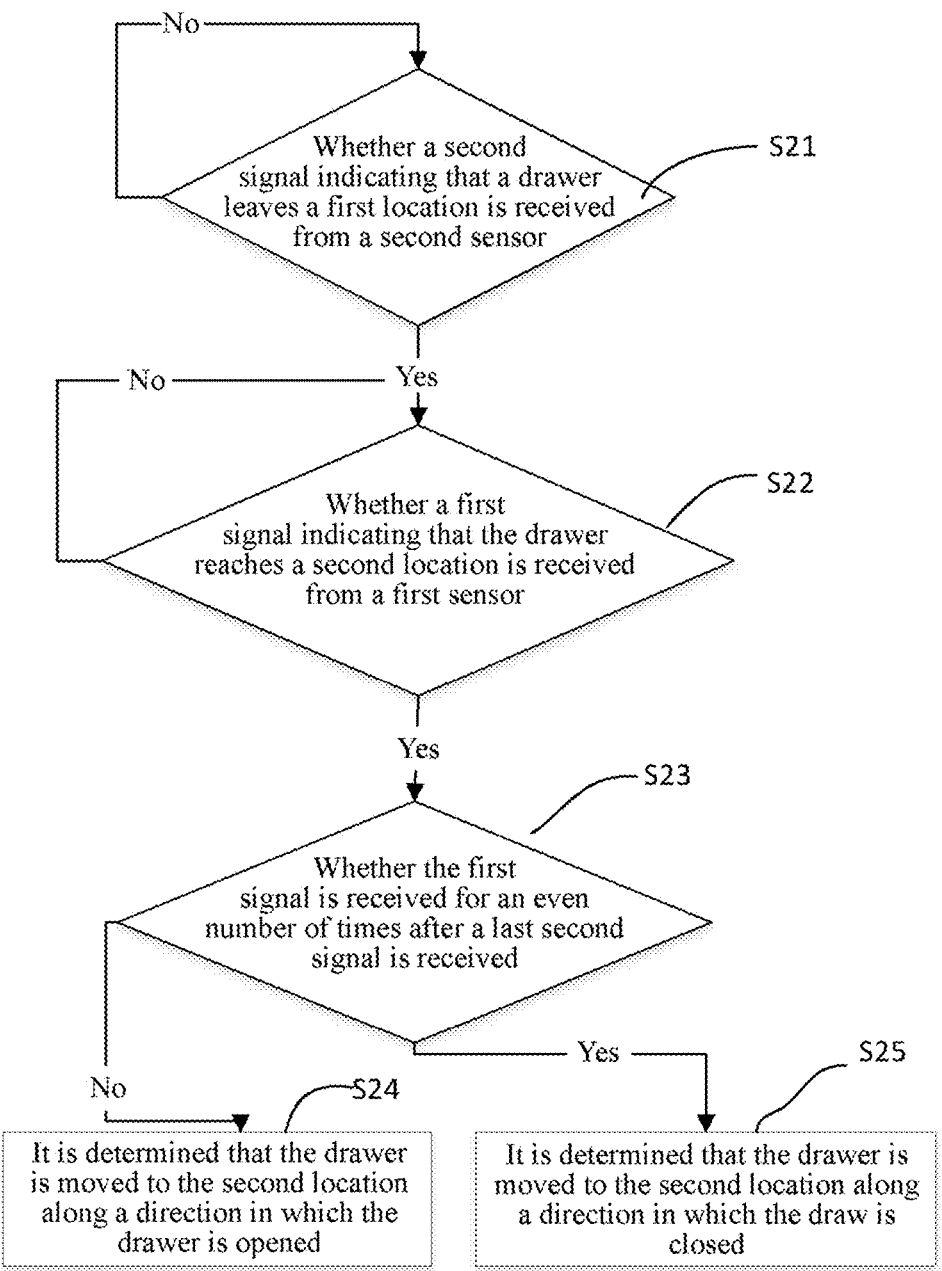
FIG. 4 is a schematic flowchart of a method for operating a refrigerator according to an embodiment of the present invention.

As shown in FIG. 4, in step S21, the control unit 5 determines whether a second signal indicating that the drawer 2 leaves the first location A1 is received from the second sensor 43. When the drawer 2 is pulled away from the first location A1 in a closed state, the second sensor 43 leaves away from the range of the trigger 42 to generate a second signal.

After the control unit 5 receives the second signal, in step S22, the control unit 5 determines whether a first signal indicating that the drawer 2 reaches the second location A2 is received from the first sensor 41. When the drawer 2 reaches the second location, the first sensor 41 is triggered by the trigger 42 to generate the first signal.

When the control unit 5 receives the first signal, the control unit 5 counts the first signal after the last second signal. In step S23, the control unit 5 determines whether the first signal is received for an even number of times since the last second signal was received. If the control unit 5 receives the first signal for an even number of times after receiving the last second signal, the control unit 5 determines that the drawer 2 is moved to the second location A2 along a direction in which the drawer is closed (S25). On the contrary, if the control unit 5 receives the first signal for an odd number of times after receiving the last second signal, the control unit 5 determines that the drawer 2 is moved to the second location A2 along the direction in which the drawer is opened (S24).

Figure 5:
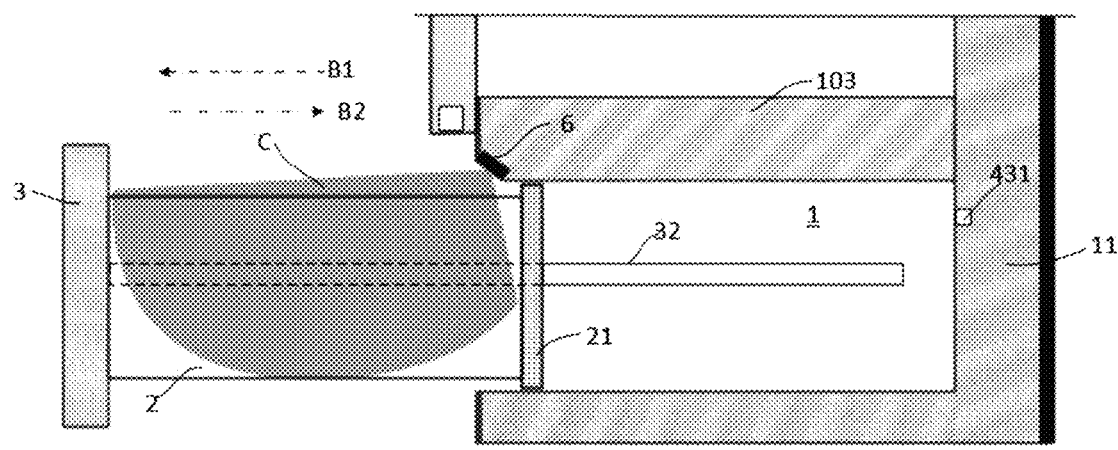
FIG. 5 is a partial side view similar to FIG. 3 showing an alternative embodiment of the present invention.

In some other embodiments, the first sensor may be a distance sensor ("the first sensor" is referred to as "a distance sensor" in this embodiment below). FIG. 5 is a schematic cross-sectional view of a refrigerator according to an exemplary embodiment of the present invention.

A distance sensor 431 may be fixed to a rear wall 21 of a drawer 2 or, as shown, it may be located on a rear wall 11 of a receiving chamber 1 directly behind the drawer 2. As shown in FIG. 5, a detecting unit includes the distance sensor 431 fixed to the rear wall 11 of the receiving chamber 1. The distance sensor 431 is configured to detect a distance between the drawer 2 that is opened and the distance sensor 431.

The distance sensor 431 may be, for example, an infrared distance sensor, an ultrasonic distance sensor, or a radar distance sensor.

In some embodiments, after the drawer 2 is opened, when the distance sensor 431 detects, for an even number of times, that the drawer 2 reaches a second location, the control unit 5 determines that the drawer 2 is moved to the second location along a direction in which the drawer is closed. When the distance sensor 431 detects, for an odd number of times, that the drawer 2 reaches the second location, the control unit 5 determines that the drawer 2 is moved to the second location along a direction in which the drawer is opened. When the drawer 2 is closed, a number of times for which the distance sensor 431 detects that the drawer 2 reaches the second location is cleared.

In this embodiment, it may be determined whether the drawer 2 is in a closed state using the distance sensor 431, or a second sensor 43 and a trigger 42 are additionally disposed to detect whether the drawer 2 is in the closed state (first location).

The control unit 5 controls, based on a detection result of the distance sensor 431, a power-consuming function component associated with the drawer 2.

The control unit 5 may be disposed in such way that the power-consuming function component performs an operation after the drawer 2 that is opened is moved to the second location A2 toward the first location (the direction in which the drawer is closed).

In some other embodiments, the control unit 5 may be disposed in such way that the power-consuming function component performs an operation after the drawer 2 that is opened is moved to the second location A2 toward a third location (a direction in which the drawer is opened).

The control unit 5 may further be disposed in such way that the power-consuming function component performs an operation after it is determined that the drawer 2 is moved to the second location A2.

Figure 6:
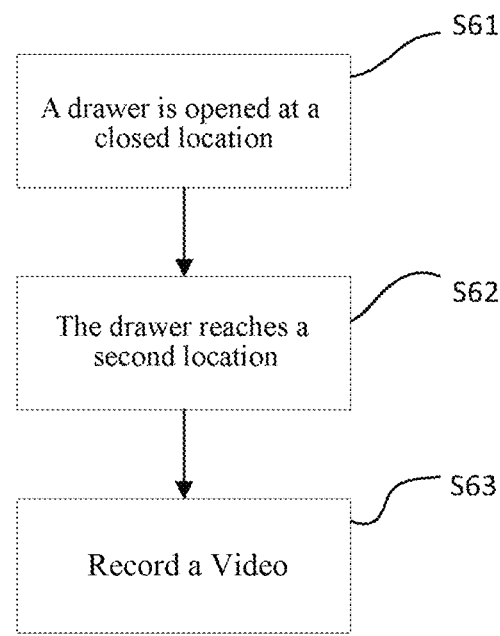
FIG. 6 is a schematic flowchart of a method for operating a refrigerator according to an embodiment of the present invention.

An exemplary embodiment in which the video recording module is used as the power-consuming function component is used for detailed description with reference to FIG. 6 below.

In step S61, the drawer 2 leaves a first location A1. This can be obtained through detection using the second sensor 43 or the distance sensor 431.

In step S62, the drawer 2 is moved to a second location A2 along a preset direction. This can be determined by the control units 5 based on feedback from the detecting unit. That the control units 5 determines, based on the feedback from the detecting unit, whether the drawer 2 reach a trigger location at which the power-consuming function component operates may be implemented according to any of the solutions of the foregoing embodiments.

When it is determined that the drawer 2 reaches the second location, in step S63, the video recording module 6 records a video of an interior of the drawer 2 that is opened. Photographs obtained by the video recording module 6 may be sent to a cloud server through a communication module.

In some embodiments, after it is determined that the drawer 2 is moved to the second location along the direction in which the drawer is closed, the video recording module 6 records a video of the interior of the drawer 2 that is opened. In some embodiments, after it is determined that the drawer 2 is moved to the second location along the direction in which the drawer is opened, the video recording module 6 records a video of the interior of the drawer 2 that is opened. In some other embodiments, regardless of a direction in which the drawer 2 is moved to the second location, the video recording module 6 records a video of the interior of the drawer 2.

The control units 5 may generate an instruction for triggering the video recording module 6 to record a video of the interior of the drawer 2 immediately after determining that the drawer 2 is moved to the second location along a predetermined direction. In some other embodiments, the control units 5 starts counting when determining that the drawer 2 is moved to the second location along the predetermined direction, and the video recording module 6 records a video of the interior of the drawer 2 when a preset duration elapses.

In some embodiments, after step S61, the video recording module 6 may enter a standby mode from a sleep mode to prepare for video recording.

In some embodiments, after step S61, an illumination unit 7 may be enabled to improve an illumination state within the drawer 2 or to improve quality of video recording.

When the drawer 2 is closed, the video recording module 6 may enter the sleep mode, and the illumination unit 7 is turned off.

The power-consuming function component may be the illumination unit 7 for illuminating the drawer 2 that is opened, the control unit 5 receiving feedback of the detecting unit to control the illumination unit 7. In some embodiments, when the control unit 5 determines that the drawer 2 reaches the second location, the illumination unit 7 is turned on to assist in recording a video of and/or increasing luminance within the drawer. In some embodiments, the illumination unit 7 is opened after the drawer 2 leaves the first location, and when the drawer 2 is between the second location and the third location, luminance of the illumination unit 7 is higher than that of the illumination unit 7 when the drawer 2 is between the second location and the first location.

In the foregoing embodiment, the illumination unit 7 is disposed at a bottom of a door 104, and in some other embodiments, the illumination unit 7 may also be disposed at a front end of a separation wall 103. For example, the illumination unit 7 may be disposed in a same mounting chamber as the video recording module 6. The illumination unit 7 may be used as an auxiliary illumination device of the video recording module 6.

Figure 7:
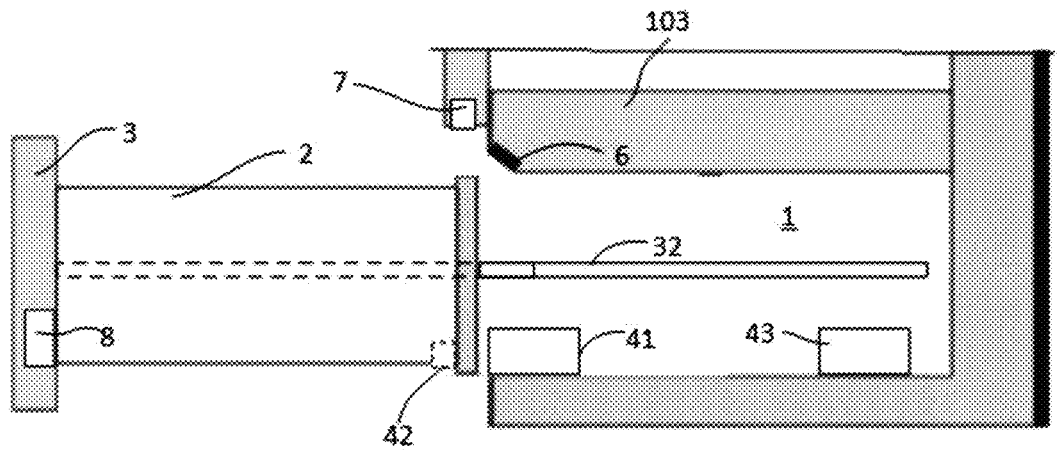
FIG. 7 is a partial side view of a refrigerator according to another embodiment of the present invention.

FIG. 7 is a schematic cross-sectional view of a refrigerator according to another embodiment of the present invention. As shown in FIG. 7, a power-consuming function component associated with a drawer 2 includes a drive component 8 for driving the drawer 2 to move. The drive component 8 is adapted to drive the drawer 2 to move along a preset direction after the drawer 2 reaches a second location A2. The drive component 8 may include a motor.

The drive component 8 may be disposed within the door 3. After the drawer 2 reaches the second location A2, a drive device 8 drives the drawer 2 to move along the door 3 in a vertical or horizontal direction to help the user place or take out food.

In some other embodiments, the drive component 8 may be disposed in a cabinet 101 to drive the drawer 2 to move forward to assist in opening or closing the door 3.

In the foregoing embodiment, the second location A2 is located between the first location A1 and a third location A3. In some embodiments, for example, when a video recording module 6 and/or an illumination unit 7 are/is trigged, the second location A2 may be closer to the third location A3 than the first location A1.

In some other embodiments, the second location A2 may be overlapped with the third location A3, that is, the drawer 2 is in a maximum open state at the second location A2. For example, when the drawer 2 is moved to a maximum open state, the drive component 8 is enabled. In some other embodiments, when a detecting unit detects that the drawer 2 reaches a maximum open location, the video recording module 6 performs video recording.

Figure 8:
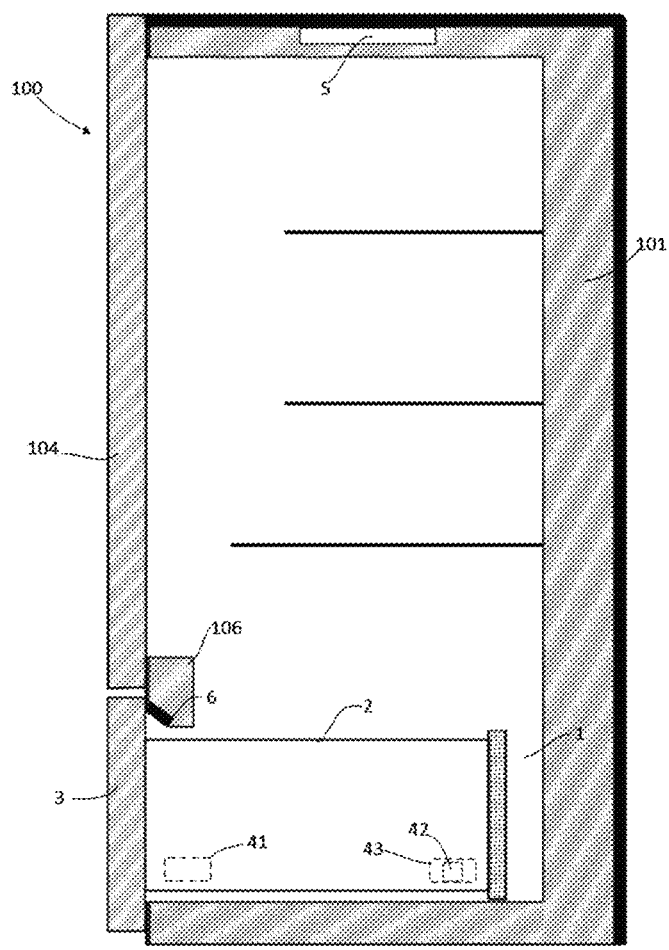
FIG. 8 is a schematic cross-sectional view of a refrigerator according to another embodiment of the present invention.

FIG. 8 is a schematic cross-sectional view of a refrigerator according to another embodiment of the present invention. As shown in FIG. 8, a main difference between this embodiment and the embodiments in FIG. 1 to FIG. 3 is a structure of a cabinet 101. In this embodiment, the cabinet 101 includes a beam 106 that spans a pair of side walls of a receiving chamber 1. The beam 106 is disposed above a drawer 2.

The video recording module 6 is disposed at a front portion of the beam 106. The video recording module 6 is disposed downward and obliquely toward a front of a refrigerator 100. The control unit 5 and the detecting unit may be disposed in the same manner as that in the foregoing embodiment.

Various embodiments described with reference to FIG. 1 to FIG. 8 may be combined with each other in any given manner, to achieve the advantages of the present invention. In addition, the present invention is not limited to the embodiments. Generally, other means different from the means shown may also be used, as long as these means can achieve the same effect.

The invention claimed is:
1. A refrigerator, comprising:
a refrigerator body formed with a receiving chamber;

a drawer movably received in said receiving chamber, said drawer being at a first location when said drawer is closed and being movable to a second location that is spaced from the first location;

a first sensor mounted to move with said drawer or being fixed to a wall of said receiving chamber, said first sensor configured to detect whether the drawer reaches the second location that is spaced from the first location;

a second sensor configured to detect whether said drawer is at the first location;

a trigger cooperating with said first sensor and said second sensor;

a control unit determining, based on feedback of said first sensor and said second sensor, a direction in which the drawer is being moved to the second location; and a power-consuming function component associated with said drawer; said control unit configured to control said power-consuming function component based on a detection result of said first sensor;

wherein after receiving, from the second sensor, a signal indicating that the drawer leaves the first location, when receiving, from said first sensor for an even number of times, a signal indicating that said drawer reaches the second location, said control unit determines that said drawer is moved to the second location along a direction in which said drawer is closed;

wherein the second location is located between the first location and a third location, and the drawer is in a maximum open state at the third location.

2. The refrigerator according to claim 1, wherein the second location is closer to the third location than the first location.

3. The refrigerator according to claim 1, wherein the drawer is in a maximum open state at the second location.

4. The refrigerator according to claim 1, wherein said trigger is adapted to generate a physical quantity adapted to be sensed by said first sensor; or said first sensor comprises a mechanical switch, said trigger being adapted to mechanically trigger the mechanical switch at the second location.

5. The refrigerator according to claim 4, wherein said first sensor comprises a magnetosensitive element, and said trigger comprises a magnet.

6. The refrigerator according to claim 1, wherein said second sensor and said first sensor are spaced apart by a spacing distance along a direction in which the drawer is movable, and said trigger is configured to cooperate with said second sensor at the first location.

7. The refrigerator according to claim 1, wherein after receiving, from said second sensor, a signal indicating that the drawer leaves the first location, when receiving, from said first sensor for an odd number of times, a signal indicating that said drawer reaches the second location, said control unit determines that said drawer is moved to the second location along a direction in which the drawer is opened.

8. The refrigerator according to claim 1, wherein said first sensor comprises a distance sensor configured to detect a distance between said drawer and a reference object and to detect whether said drawer reaches the second location.

9. The refrigerator according to claim 8, wherein said first sensor is connected to said control unit, and wherein, when said first sensor detects, for an even number of times, that said drawer is at the second location after said drawer leaves the first location, said control unit determines that said drawer is moved to the second location along a direction in which said drawer is closed.

10. The refrigerator according to claim 1, wherein:
said power-consuming function component comprises a video recorder disposed above said drawer;
after said control unit determines that said drawer is moved to the second location along a direction in which said drawer is opened, said video recorder records a video of an interior of said drawer; and/or
after said control unit determines that said drawer is moved to the second location along a direction in which said drawer is closed, said video recorder records a video of an interior of said drawer.

11. The refrigerator according to claim 1, wherein:
said power-consuming function component comprises a video recorder disposed above said drawer;
said control unit is configured to start timing when said drawer reaches the second location; and
said video recorder recording a video of an interior of said drawer when a preset duration elapses.

12. The refrigerator according to claim 1, wherein said power-consuming function component comprises a video recorder disposed above said drawer and oriented downward and obliquely toward a front of the refrigerator.

13. The refrigerator according to claim 12, wherein said video recorder is disposed at a front portion of a top wall of said receiving chamber or affixed to a beam that connects said receiving chamber to a pair of side walls and is located above said drawer.

14. The refrigerator according to claim 1, wherein said power-consuming function component comprises an illuminator for illuminating said drawer when said drawer is opened and at the third location, or when said drawer is located between the second location and the third location, and wherein a luminance of said illuminator is higher than a luminance when said drawer is located between the second location and the first location.

15. The refrigerator according to claim 1, wherein said power-consuming function component comprises a drive component for driving said drawer to move, said drive component being enabled to drive said drawer to move when said drawer reaches the second location.

16. A method for operating a refrigerator, the method comprising:
providing the refrigerator with a receiving chamber, a drawer movably received in the receiving chamber, a first sensor mounted to move with the drawer or being fixed to a wall of the receiving chamber, and a second sensor configured to detect whether the drawer is at the first location, the drawer being at a first location when the drawer is closed and being movable to a second location that is spaced from the first location, the first sensor configured to detect whether the drawer reaches the second location that is spaced from the first location;
providing the refrigerator with a video recorder disposed above the drawer;
the method comprising:
detecting, with the first sensor, whether the drawer leaving the first location reaches a second location that is spaced apart from the first location; and
causing, with a control unit based on a detection result of the first sensor, the video recorder to record a video of an interior of the drawer.

17. The method according to claim 16, which comprises determining with the control unit, based on a direction in which the drawer is being moved to the second location, whether the video recorder records a video of the interior of the drawer.

18. The method according to claim 17, which comprises detecting with the second sensor whether the drawer leaves the first location, and determining with the control unit, according to detection results of the first sensor and the second sensor, a direction in which the drawer is being moved to the second location.

19. The method according to claim 17, which comprises, when the drawer is moved to the second location along a closing direction of the drawer, recording, with the video recorder, a video of the interior of the drawer.

20. A method for operating a refrigerator, the refrigerator having a receiving chamber, a drawer that may be pushed into or pulled out of the receiving chamber, an illuminator for illuminating an interior of the drawer when the drawer is opened, and a first sensor mounted for movement with the drawer or affixed to a wall of the receiving chamber, and wherein the drawer is closed at a first location, the method comprising:
- detecting, with the first sensor, whether the drawer leaving the first location reaches a second location that is spaced apart from the first location; and
- using a control unit for controlling the illuminator based on a detection result of the first sensor.

21. A method for operating a refrigerator, the refrigerator including a refrigerator body formed with a receiving chamber, a drawer movably received in the receiving chamber, the drawer being at a first location when the drawer is closed and being movable to a second location that is spaced from the first location, a first sensor mounted to move with the drawer or being fixed to a wall of the receiving chamber, the first sensor configured to detect whether the drawer reaches the second location that is spaced from the first location, a second sensor configured to detect whether the drawer is at the first location, a trigger cooperating with the first sensor and the second sensor, and a control unit, the method which comprises:
- determining, with the control unit, a direction in which the drawer is being moved to the second location based on feedback of the first sensor and the second sensor;
- controlling, with the control unit, a power-consuming function component, which is associated with the drawer, based on a detection result of the first sensor;
- wherein after receiving, from the second sensor, a signal indicating that the drawer leaves the first location, when receiving, from the first sensor for an even number of times, a signal indicating that the drawer reaches the second location, the control unit determining that the drawer is moved to the second location along a direction in which the drawer is closed;
- wherein the second location is located between the first location and a third location, and the drawer is in a maximum open state at the third location.

* * * * *